INVENTOR
L. EGERTON
BY
ATTORNEY

Patented Dec. 25, 1945

2,391,685

UNITED STATES PATENT OFFICE 2,391,685

STABILIZATION OF HALOGENATED COMPOUNDS

Lawson Egerton, Summit, N. J., assignor to Bell Telephone Laboratories, Incorporated, New York, N. Y., a corporation of New York Application November 14, 1940, Serial No. 365,633

9 Claims. (Cl. 175—41)

The present invention relates to compositions of matter comprising halogen-containing organic substances which are treated to render them non-corrosive of metals, and to apparatus, more particularly electrical apparatus, such as electrical condensers, in which such treated halogen-containing organic substances are maintained in contact with metal.

It is an object of the present invention to prolong the life of electrical capacitors which employ, in contact with metal armatures, dielectrics containing organic substances which possess halogen atoms within their molecules, and to stabilize such capacitors so that their dielectrics retain more uniform values of leakage current and power factor.

It is a more general object of the present invention to treat halogen-containing organic substances which are maintained in contact with metal, or are intended to be maintained in contact with metal, so as to render them non-corrosive.

Halogenated aryl compounds and more particularly the halogenated aromatic hydrocarbons, such as chlorinated diphenyl and chlorinated naphthalene, are known to be useful electrical insulating materials because of their relatively high thermal stability, resistance to oxidation, non-inflammability, low conductivity and other valuable properties. Most of the halogenated aromatic hydrocarbons used commercially are made up of polar molecules and, therefore, possess a high dielectric constant which makes them especially useful in capacitors.

Despite these advantages dielectrics containing such compounds often deteriorate at a faster rate than do the dielectric materials which do not contain halogens, particularly when employed under moderately elevated temperatures, high electrical stress or both. This deterioration may manifest itself in one or more of three ways. The leakage current may rise to an unduly high value or in the case of condensers operating on alternating current the power factor may rise unduly. The deterioration may also result in the complete breakdown of the dielectric within a short time causing a short circuit of the apparatus.

This deterioration has been found to be associated with a chemical interaction between the metallic elements of the apparatus and the halogenated compounds or their halogen-containing decomposition products.

When the metal in contact with the halogenated compound is aluminum, it is apparently the decomposition products of the halogenated material which interact with the metal. In an electrical capacitor, for instance, having aluminum armatures separated by paper which is impregnated with a halogenated aromatic hydrocarbon such as chlorinated naphthalene or chlorinated diphenyl, it appears that upon the application of an electrical potential, particularly at a moderately elevated temperature, hydrogen chloride and other acid, halogen-containing decomposition products are split off from the chlorinated compound. The hydrogen chloride or halogen ion from other decomposition products appears to attack the aluminum armatures forming aluminum chloride, which is a powerful catalyst for the decomposition of organic compounds. The thus-formed aluminum chloride causes the further decomposition of the chlorinated impregnant, with the production of more halogen-containing decomposition products, which react with the aluminum, forming more aluminum chloride. The cycle is thus continued at an accelerated rate. Both the hydrogen chloride and the aluminum chloride contribute to the decomposition of the paper and also increase local conductivity, causing the generation of heat which accelerates the breakdown of the chlorinated impregnant and which accelerates the electrolysis of the paper. The hydrogen chloride which is split off in the initial decomposition of the chlorinated compound is produced in such small quantities that it would not cause the rapid destruction of the dielectric, but the accelerating action of the aluminum chloride produced by the reaction of the hydrogen chloride with the metal armatures causes relatively rapid deterioration.

In other cases, such as when tin is maintained in contact with the halogenated hydrocarbon, there appears to be a direct reaction between the halogenated substance and the metal without the necessity of the application of an electric field. Thus when an electrical capacitor made up of tin foil armatures separated by paper which is impregnated with a halogenated aromatic hydrocarbon, such as chlorinated naphthalene or chlorinated diphenyl, is heated to moderately elevated temperatures, it shows an initial high power factor. Similar condensers having aluminum electrodes have, by way of contrast, a relatively low initial power factor when heated to moderately elevated temperatures; the power factor increases only after the application of an electrical potential which, as discussed above, is assumed to cause the splitting off of hydrogen chloride from the impregnant. The high initial power factor of the tin foil capacitors obviously results from a direct interaction between the halogenated impregnant and the tin foil armatures at elevated temperatures.

It has been found that the addition of corrosion inhibitors to the halogenated aromatic hydrocarbons or other halogenated organic compounds used as impregnants in electrical capacitors will decrease to a marked extent the deterioration of the dielectric as evidenced by longer life and lower and more uniform values of leakage current and power factor. These corrosion inhibitors apparently function by materially retarding the rate at which the metal armatures are attacked by the halogenated impregnants or their halogen-containing decomposition products. Thus the cycle of deterioration of condenser dielectrics, described above, is interrupted. The small amount of hydrogen chloride initially formed in the dielectric is not of itself sufficient to cause rapid deterioration in the absence of other harmful reaction products whose formation is induced by the armature metals.

The present invention is based upon the discovery that the nitroaromatic compounds are particularly effective inhibitors for preventing the attack of halogenated organic compounds or their halogen-containing decomposition products on metals, particularly aluminum and tin, and the discovery that due to this effective action in inhibiting such corrosion the nitro-aromatic compounds, when added to the halogenated substances used in impregnating paper dielectrics in electrical condensers, will produce a very definite decrease in the rate of deterioration of these dielectrics.

The nitro-aromatic compounds embraced within the scope of the present invention contain at least one nitro-group bonded directly to a carbon atom of the aromatic ring. Compounds containing one nitro-group or two nitro-groups bonded to aromatic carbon atoms are effective inhibitors. The trinitro-aromatic compounds are also satisfactory from the standpoint of being good inhibitors, but their use is not practical because of their explosive nature. Both the nitro-aromatic hydrocarbons and the substituted derivatives of the nitro-aromatic hydrocarbons are suitable for the purposes of the present invention provided the substituents are not those which have an undue tendency to form ionized electrolytes in the presence of acidic materials, such as hydrogen chloride. Compounds which result in the formation of substantial quantities of ions cause too high conductivity for electrical use. The amino and hydroxyl groups are the chief substituents which are objectionable from the standpoint of causing ionization. Other substituents, notably alkyl and halogen groups, produce very satisfactory derivatives of the nitro-aromatic hydrocarbons.

The nitro-aromatic compounds are in general soluble in the halogenated aromatic hydrocarbons and other halogenated organic compounds. In general the nitro-aromatic compounds may be used for the purposes of the present invention in the technical as well as the chemically pure state. However, since the compounds of technical purity often have much poorer insulating properties than the pure compounds, it may be necessary in the case of the technical compounds to limit the proportion of nitro-aromatic compound added to halogenated organic compounds intended for electrical use, in order to prevent an excessively high initial conductivity. For use in electrical condensers the resistivity of the mixture of halogenated organic compound and inhibitor used as the impregnant should be considerably in excess of $10^8$ ohms per $cm.^3$ The corrosion inhibiting action of the nitroaromatic compounds can be demonstrated by a simple test using the test cell shown in the drawing in which:

Figure 1:
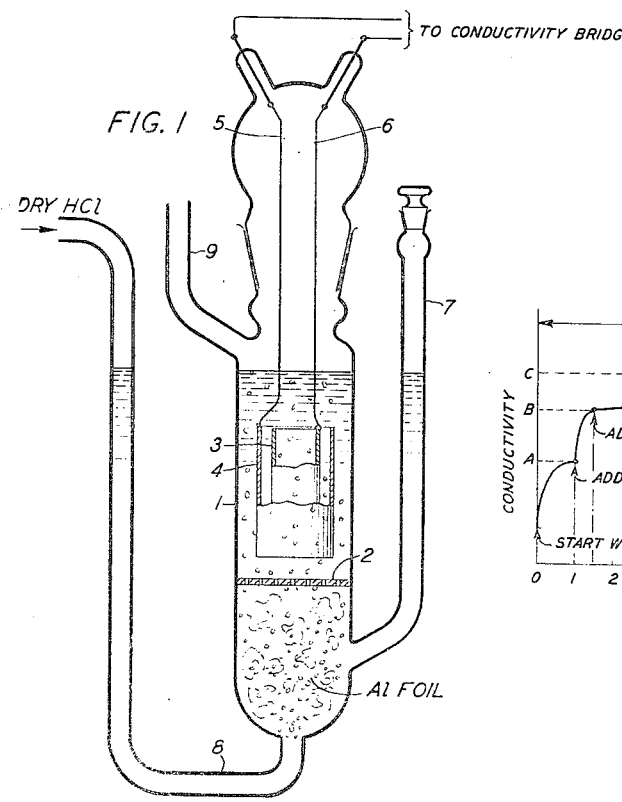
Fig. 1 is a diagrammatic showing of a conductivity cell which may be used for determining the suitability of any particular corrosion inhibitor for stabilizing halogenated organic compounds.

In the conductivity cell show in Fig. 1 a tubular glass reaction chamber 1 divided longitudinally by a perforated glass disc 2 encloses a pair of concentric cylindrical metal electrodes 3 and 4. These metal electrodes are formed of any suitable non-corroding metal such as heavily gold-plated brass. To each of the electrodes is attached a lead 5, 6 which passes to the outside of the reaction chamber and runs to a conductivity bridge as indicated in the drawing. The lower section of the reaction chamber contains a side arm 7 for the insertion of liquid and solid reagents and a bottom inlet 8 for the introduction of gaseous hydrogen chloride. An outlet 9 is provided in the upper portion of the reaction chamber to permit the escape of unabsorbed gases.

In the operation of the cell the reaction chamber is filled with pentachlor diphenyl which is thereafter maintained at 100° C. and dry hydrogen chloride is introduced into the bottom of the reaction chamber and allowed to bubble through the halogenated compound until it has become saturated. The conductivity of the liquid lying between the two concentric electrodes is measured periodically. As the hydrogen chloride is introduced the conductivity rises until saturation is reached, at which point the conductivity assumes a fairly constant value. A small amount of the corrosion inhibitor to be tested is then added to the reaction chamber and the bubbling of hydrogen chloride through the mixture is continued. The conductivity again rises in most cases until saturation is reached, at which point it becomes fairly constant. Small pieces of aluminum foil of the type commonly used in electric condensers (such as the standard condenser foil produced by the Aluminum Company of America) are then inserted in the reaction chamber through the side inlet 7 and the introduction of hydrogen chloride is continued. Such aluminum foil has a purity in the vicinity of 99.8 per cent and has a thickness less than .0005 inch. The conductivity again rises at a rate which is dependent upon the efficiency of the corrosion inhibitor which has been added.

If the aluminum foil is added to pentachlor diphenyl containing no corrosion inhibitor, and hydrogen chloride is bubbled through the mixture, the conductivity increases rapidly to a high value. If an effective inhibitor, such as one of the nitro-aromatic compounds listed below, is added to pentachlor diphenyl prior to the introduction of the aluminum foil the conductivity increases only very slightly over a relatively long period of time. It is thus quite clear that the nitro-aromatic compounds are effective inhibitors of the reaction between hydrogen chloride and aluminum which causes a rapid increase in the conductivity of halogenated compounds maintained in contact with aluminum. The relative effectiveness of various inhibitors may be determined by observing the rate of increase in the conductivity of the pentachlor diphenyl in the test cell after the addition of the aluminum foil.

It can thus be seen that the conductivity cell affords a simple test for determining the suitability of various corrosion inhibitors for the stabilization of halogenated compounds to be used for impregnating electric capacitors or for similar purposes. In the test described above, pentachlor diphenyl has been used as representative of the halogenated organic compounds in measuring the relative effectiveness of inhibitors. In general, the results obtained with pentachlor diphenyl for the relative effectiveness of inhibitors will be valid for other halogenated compounds. However, it is obvious that similar tests may be conducted with other specific halogenated compounds to be stabilized, if it is so desired.

Similarly in the test described above, aluminum has been used as the metal which accelerates decomposition. The results obtained with aluminum will in general indicate the suitable inhibitors to be used in apparatus wherein halogenated compounds are maintained in contact with either aluminum or tin. For apparatus employing other metals which accelerate deterioration, it may be desirable to employ these other metals in the test described above for determining the most suitable inhibitors.

Figure 2:
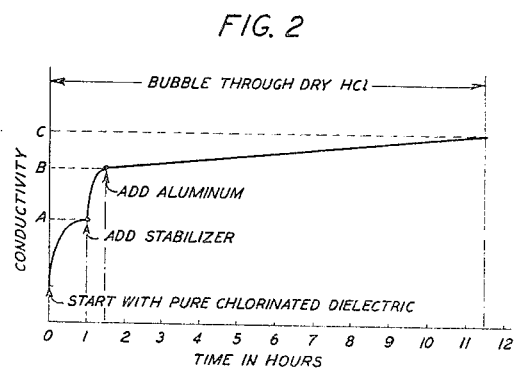
Fig. 2 is a chart showing the change in conductivity with time of the halogenated compound during the operation of the conductivity cell of Fig. 1.

In Fig. 2 is shown an idealized and generalized curve indicating the change in conductivity which takes place during the various phases of the test. It can be seen from this curve that the conductivity of the halogenated compound increases from a low value, as hydrogen chloride is bubbled through it, to a somewhat higher value at saturation, represented by the point A. After the stabilizer is added and the bubbling of hydrogen chloride is continued, the conductivity may rise to a new relatively stable value B or it may remain fixed in which case the point B coincides with point A. The degree of conductivity rise between the points A and B is dependent upon the character of the stabilizer. At the point B aluminum is added to the mixture and the bubbling of hydrogen chloride is continued. The conductivity thereafter rises at a rate which is dependent upon the effectiveness of the stabilizer. The point C represents the value of the conductivity ten hours after the addition of the aluminum. It has been found that an inhibitor, to be satisfactory for stabilizing an electric capacitor, should not increase the conductivity between the points A and B by a value greater than three times the value of the conductivity at the point A. Further the corrosion inhibitor should be sufficiently effective to prevent the increase in conductivity above the point B in ten hours from exceeding 75 per cent of the absolute value of the conductivity at the point B.

The nitro-aromatic compounds will in general meet the test set forth above when used in the proper proportion. As stated above, when the technical grades are used, it may be necessary to limit the amount of nitro-aromatic compound added so that the conductivity before the addition of the aluminum does not exceed the value set forth.

Figure 3:
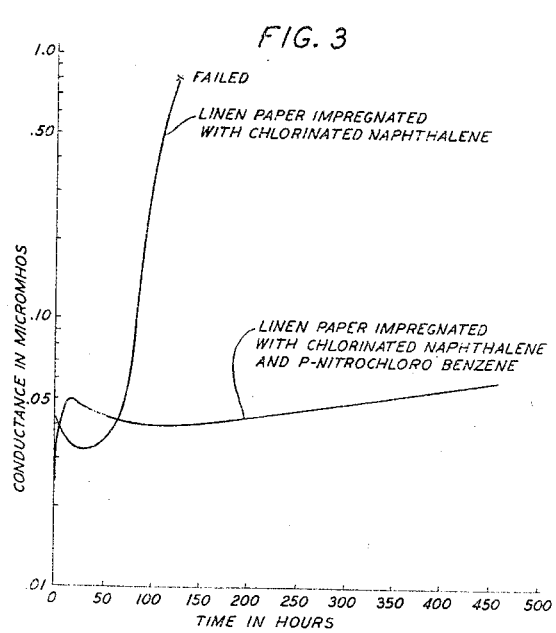
Fig. 3 is a chart showing the change in leakage current with time in two electric capacitors impregnated with a halogenated organic compound, one of said capacitors containing a corrosion inhibitor and the other containing no inhibitor.

The manner in which the corrosion inhibiting action of the nitro-aromatic compounds serves to improve remarkably the performance of electrical capacitors containing halogenated dielectrics is illustrated by Fig. 3. The curves in Fig. 3 show the changing conductance of the dielectrics of two sets of capacitors plotted against time. Each of the two sets of condensers was made up of two aluminum foil electrodes separated by sheets of linen paper impregnated with chlorinated naphthalene. In one case the impregnant consisted of pure chlorinated naphthalene whereas in the other case the chlorinated naphthalene impregnant contained 1 per cent p-nitro-chlorobenzene. The test upon each set of condensers was run at 100° C. under a potential of 240 volts direct current. It can be seen that the conductance of the unstabilized condenser increases rapidly, causing failure of the dielectric after about 130 hours. The stabilized condenser changed very little in conductance over a long period of time and had not failed after about 460 hours.

Other nitro-aromatic compounds act similarly in stabilizing the leakage current and in increasing life. Typical of the improvement in life brought about by various nitro-aromatic compounds are the results given in the following table. This table gives the results of accelerated life tests run upon electrical condensers having aluminum armatures and dielectrics made up of linen paper impregnated with chlorinated naphthalene containing 1 per cent of various nitro-aromatic compounds as corrosion inhibitors. The condensers were maintained at 100° C. during the test and a potential of 240 volts direct current was maintained across the dielectric.

Table

| Inhibitor | Time of failure |
|---|---|
| | Hours |
| None | 94 to 130 |
| Nitrobenzene | 618 |
| p-Nitrochlorobenzene | [1] >1,400 |
| o-Nitrochlorobenzene | 630 |
| α-Nitronaphthalene | 432 |
| α-Nitronaphthalene (pure) | 560 |
| p-Nitrotoluene | 570 |
| 2-nitro, 6-chlorotoluene | 522 |
| Trichloronitro m-fluorotoluene | 316 |
| Pentamethylnitrobenzene | 666 |
| 5-nitro, 3, 4-dichloro-o-xylene | 680 |
| p-Nitrodiphenyl | 810 |
| o-Dinitrobenzene | [1] >618 |
| Dinitroprehnitene | 440 |
| Dinitrodurene | 1,280 |
| Nitroquinoline | 215 |

[1] Test discontinued.

The corrosion inhibitors of the present invention may be added in any suitable concentration to the halogenated compounds to be stabilized. All of the inhibitors described show some effectiveness in concentrations as low as .1 per cent by weight of the halogenated compounds but do not reach their full potential effectiveness below about .25 per cent. The full effect of the inhibitor is usually achieved when it is present in an amount of about 2 per cent by weight, and further increases in concentration beyond this point will usually not result in any substantial increase in stability in the presence of a metal. However, obviously, considerably larger proportions of inhibitor may be employed if they do not impart otherwise undesirable properties to the mixture. Desirable concentrations are usually about .5 per cent and about 1 per cent.

Figure 4:
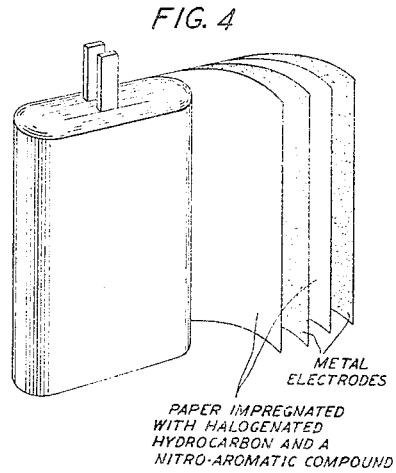
Fig. 4 represents a simple rolled condenser made up of two sheets of metal foil separated by two dielectric sheets.

Fig. 4 represents a conventional rolled condenser of the type to which the present invention is applicable. It is made up of two sheets of metal foil such as tin or aluminum separated by two sheets of paper or other porous spacer impregnated with a halogenated hydrocarbon containing a corrosion inhibitor, the interleaved sheets being rolled into the form shown in the drawing.

Because of the solubility of the inhibitors described above in halogenated aromatic hydrocarbons, the stabilized condensers of the present invention can be most conveniently prepared by dissolving the desired percentage of the inhibitor in the halogenated aromatic hydrocarbon impregnating compound. The rolled condensers, for example, may be prepared by interleaving any suitable metal foil, such as aluminum or tin foil, with any suitable porous spacer, such as linen or kraft paper, and rolling the interleaved sheets in the conventional manner. The rolled condenser may then be impregnated by any suitable process, such as vacuum impregnation, with a suitable halogenated aromatic compound having dissolved therein a small percentage of a corrosion inhibitor. As suitable impregnating compounds any of those set forth in the table above may be mentioned as well as impregnating compounds containing the same inhibitors dissolved in other halogenated aromatic hydrocarbons such as chlorinated diphenyl.

The effect of inhibitors in electrical capacitors having halogen-containing dielectrics has been described above. It is obvious that these same inhibitors will be of value in preventing the corrosive action of halogenated aromatic compounds in other pieces of apparatus and under other conditions where they are maintained in contact with metals, particularly with aluminum and tin. In so far as the same general mechanism of corrosion with resultant acceleration of decomposition is common to other organic compounds containing halogen atoms, the same inhibitors will be useful for preventing corrosion, as for instance in the case of halogenated straight chain aliphatic hydrocarbons, halogenated alicyclic hydrocarbons, halogenated oxygen-containing organic compounds and other halogen-containing compounds which by virtue of their halogen content tend to cause corrosion. For this reason the addition of a small amount of the above-described corrosion inhibitors to any of these halogenated organic compounds intended for technical uses may be desirable as a precaution against the corrosion of metals and the consequent accelerated decomposition of the halogen-containing compound.

The invention has been described in terms of its specific embodiments but it is to be understood that it is of broad application and is to be limited only by the scope of the appended claims.

What is claimed is:

1. An electric capacitor comprising metal armatures separated by a dielectric comprising paper impregnated with a chlorinated aromatic hydrocarbon containing a small proportion of a non-explosive aromatic compound containing a benzene ring having a nitro group substituted on at least one of its ring carbon atoms and having a substituent of at least one other ring carbon atom, said aromatic compound containing no amino or hydroxyl groups.

2. An electric capacitor comprising armatures formed of a metal selected from the group consisting of aluminum and tin separated by a dielectric comprising paper impregnated with a chlorinated aromatic hydrocarbon containing a small proportion of a nitrochlorobenzene.

3. The capacitor described in claim 2 wherein the chlorinated aromatic hydrocarbon is chlorinated diphenyl and the nitrochlorobenzene is p-nitrochlorobenzene.

4. The capacitor described in claim 2 wherein the chlorinated aromatic hydrocarbon is chlorinated naphthalene and the nitrochlorobenzene is p-nitrochlorobenzene.

5. An electric capacitor comprising armatures formed of a metal selected from the group consisting of aluminum and tin separated by a dielectric comprising paper impregnated with a chlorinated aromatic hydrocarbon containing a small proportion of dinitrobenzene.

6. An electric capacitor comprising armatures formed of a metal selected from the group consisting of aluminum and tin separated by a dielectric comprising paper impregnated with a chlorinated aromatic hydrocarbon containing a small proportion of nitrodiphenyl.

7. An article or device comprising a metal selected from the group consisting of aluminum and tin maintained in contact with a chlorinated aromatic hydrocarbon containing dissolved therein a small proportion of a non-explosive aromatic compound containing a benzene ring having a nitro group substituted on at least one of its ring carbon atoms and having a substituent on at least one other ring carbon atom, said aromatic compound containing no amino or hydroxyl groups.

8. A chlorinated diphenyl having dissolved therein a small proportion of a nitrochlorobenzene as a stabilizer against decomposition in the presence of a metal.

9. A chlorinated naphthalene having dissolved therein a small proportion of a nitrochlorobenzene.

LAWSON EGERTON.